United States Patent [19]
Parsons

[11] 3,874,027
[45] Apr. 1, 1975

[54] SHOCK ABSORBING BEARING ASSEMBLY
[75] Inventor: John S. Parsons, West Hartford, Conn.
[73] Assignee: The Stanley Works, New Britain, Conn.
[22] Filed: Oct. 25, 1973
[21] Appl. No.: 409,625

[52] U.S. Cl. ................................................. 16/128
[51] Int. Cl. ............................................. E05d 9/00
[58] Field of Search ......... 16/135, 128, 136; 49/396

[56] References Cited
UNITED STATES PATENTS

| | | | |
|---|---|---|---|
| 1,799,309 | 4/1931 | Mear | 16/135 |
| 3,299,573 | 1/1967 | Gustafson | 16/135 |
| 3,307,295 | 3/1967 | Rolin | 49/396 |
| 3,750,334 | 7/1971 | Slaybaugh | 49/396 |

Primary Examiner—Paul R. Gilliam
Assistant Examiner—Doris L. Troutman
Attorney, Agent, or Firm—Brumbaugh, Graves, Donohue & Raymond

[57] ABSTRACT

This disclosure concerns a shock absorbing bearing assembly for reinforcing a hinged door against wracking forces resulting from violent movement of the door against its stop. The bearing assembly consists of a stud and an arcuate bearing surface acting as an abutment mountable on a door and door frame with the stud substantially axially aligned with the hinge axis. Normally the stud is spaced from the arcuate abutment surface to facilitate installation of the bearing assembly on the door. However, when wracking forces are applied to the door, the stud and arcuate surface move to absorb the shock and protect the hinges.

16 Claims, 9 Drawing Figures

WRACKING FORCE

DOOR SWING

WRACKING FORCE

DOOR SWING

SHOCK ABSORBING BEARING ASSEMBLY

BACKGROUND OF THE INVENTION

1. Field of the Invention

The present invention relates generally to a shock absorbing assembly for pivotally mounted doors, and more particularly to a shock absorbing bearing assembly which is interposed to divert from the door hinges the stress resulting from shear loadings on the door, called wracking forces, thereby to prolong the useful hinge life.

Many doors exhibit an unfortunate tendency to change position relative to their jambs after a relatively few years of use. This has frequently occurred heretofore with respect to heavier types of doors, and more particularly with respect to those doors having some means for limiting the maximum angle of opening, such as an overhead door stop or automatic door closer. In these situations, the opening movement of the door is suddenly interrupted when the door has moved to the maximum angle permitted by the associated stop or other hardware. The momentum developed by a door being opened by be considerable, particularly where it has been flung open by a gust of wind or by a careless person. In such violent opening circumstances there is a tendency for the door to carry to a position beyond the limitations imposed by the door stop or door closure device. Thus, the connection point between the door and the door stop or door closure, which is at a point intermediate the width of the door, becomes a fulcrum about which the door tends to pivot as a result of its momentum. A considerable shearing or wracking force may therefore be applied directly to the hinges. The application of such forces over a period of time results in loosening or other damage to the hinges thereby causing the door to sag.

2. The Prior Art

Many attempts have been made heretofore to protect and reinforce hinges against wracking forces. For example, there is disclosed in U.S. Pat. No. 2,989,772 to J. S. Parsons, a hinge assembly for reinforcing a pivotally mounted door which utilizes a pintle common to both the fastening and reinforcing hinge components. While providing a most effective arrangement, this hinge assembly requires substantial modification of the door and frame structure, a procedure resisted by many builders.

Another hinge assembly consists of a regular butt hinge with extended and bent leaves to reinforce the hinges against wracking forces. However, this assembly does not include an additional motion limiting stop or bearing assembly to help dissipate the lateral wracking forces.

Still another proposal disclosed in U.S. Pat. No. 3,561,038 involves the use of a secondary pivot hinge. Great care however, is required to install this assembly to insure precise alignment of the secondary pivot axis and the axis of the door hinge. Such alignment is difficult to achieve in practice and, if not done properly, results in unwanted forces acting on the door hinges as the door is pivoted.

SUMMARY OF THE INVENTION

It is one object of the present invention to provide a bearing assembly for a hinged door which absorbs shearing or wracking forces developed when the door is urged beyond its intended maximum opening.

Another object of the present invention is to provide a bearing assembly for a hinged door which is operative to provide supplemental support for the door hinges only under shock conditions.

Still another object of the present invention is to provide a bearing assembly for a hinged door which may be easily installed without major modifications in either the door or door frame and without the need for precise installation or the use of special installation equipment.

In accordance with these and other objectives, the present invention provides a shock absorbing bearing assembly for a hinged door consisting of a pair of normally spaced apart bearing members secured to the door and door frame. One bearing member includes a stud substantially aligned with the axis of the door hinges. The other bearing member includes an arcuate bearing surface acting as an abutment spaced from the stud. The stud and bearing surface are mounted to engage each other in the presence of wracking forces on the door to absorb stresses that would otherwise be transmitted to the door hinges.

More particularly, in normal use of the door, the stud does not engage the arcuate abutment surface. However, when wracking forces are developed by opening of the door against a stop, movement of the door causes engagement of the stud and abutment which absorbs the wracking forces and prevents damage to the door hinges. With the stud and arcuate surface normally spaced apart, the bearing assembly may be readily installed on a door and door frame without precisely aligning the stud and arcuate bearing surface with the hinge axis.

BRIEF DESCRIPTION OF THE DRAWINGS

For a further understanding of the present invention, reference may be had to the accompanying drawings, in which.

DESCRIPTION OF THE PREFERRED EMBODIMENTS

Figure 1:
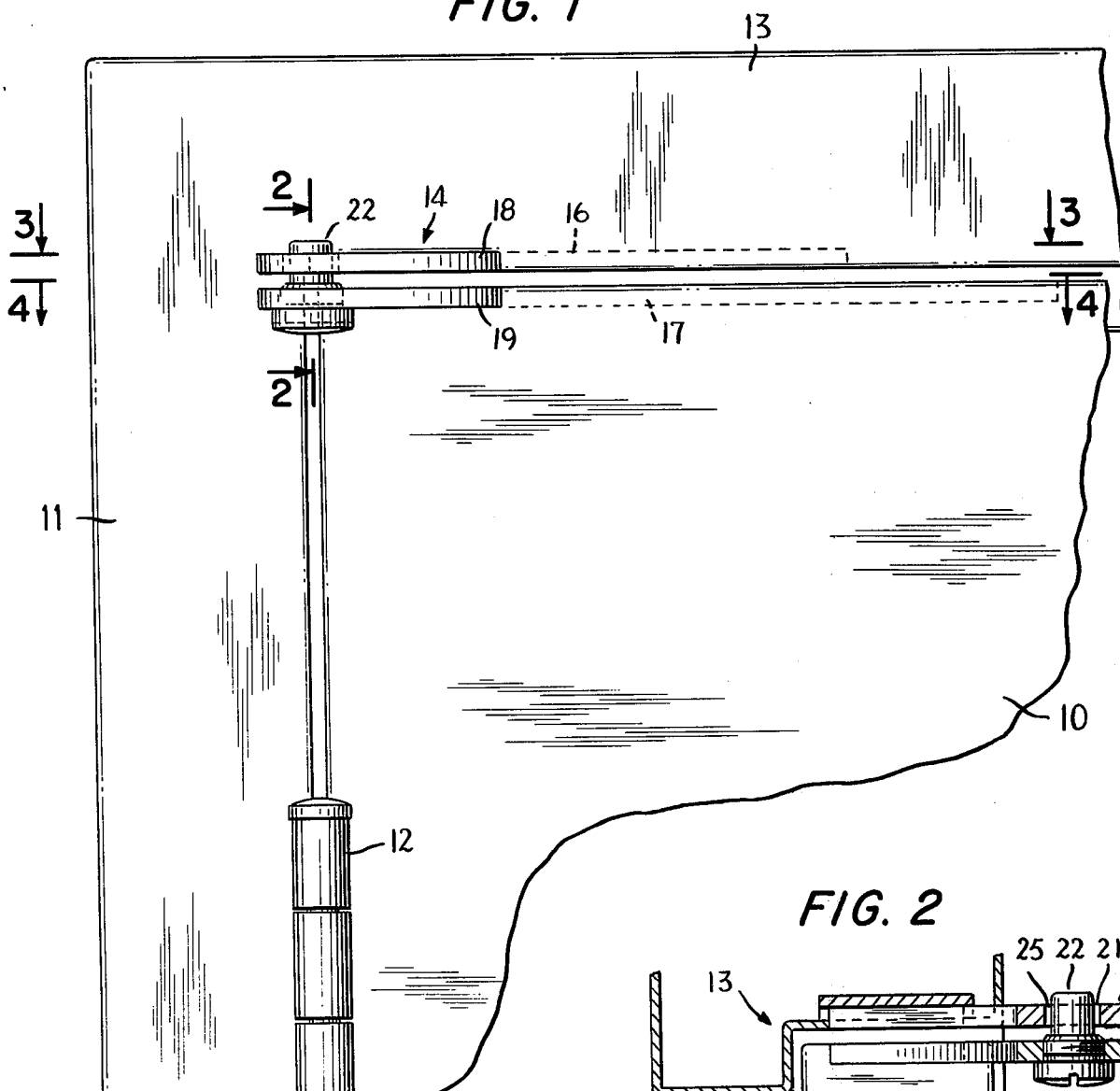
FIG. 1 is an elevation of a portion of a pivotally hinged door showing an installed bearing assembly of the present invention.
Figure 2:
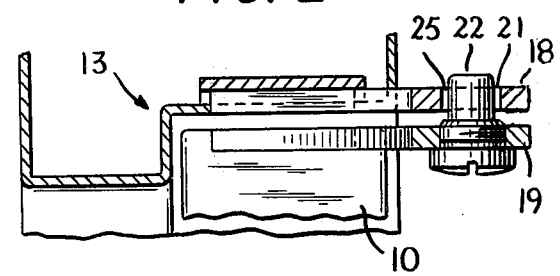
FIG. 2 is a view taken along the line 2—2 of FIG. 1.

Referring now to the drawings, and initially to FIGS. 1–5, there is illustrated a door 10 which is pivotally mounted on a door jamb 11 by means of suitable hinges 12. A lintel 13 overlies the top of the door 10 to form with the jambs a door frame.

A shock absorbing assembly, generally indicated by reference numeral 14, consists of an upper head plate or leaf 16 which is secured by means of screws 23 (FIG. 3) to the lower horizontal surface of the lintel 13. A lower head plate or leaf 17 is secured by means of screws 24 (FIG. 4) to the upper horizontal surface of the door and lies beneath the leaf 16. As outlined in phantom in FIG. 1, the head plates 16 and 17 are preferably recessed or mortised into the lintel 13 and door 10, respectively.

The inner end of each of the head plates 16 and 17 is provided, respectively, with laterally protruding flange portions 18 and 19. The flanges 18 and 19 are of similar shape, and lie in closely parallel planes throughout the range of movement of the door.

Figure 3:
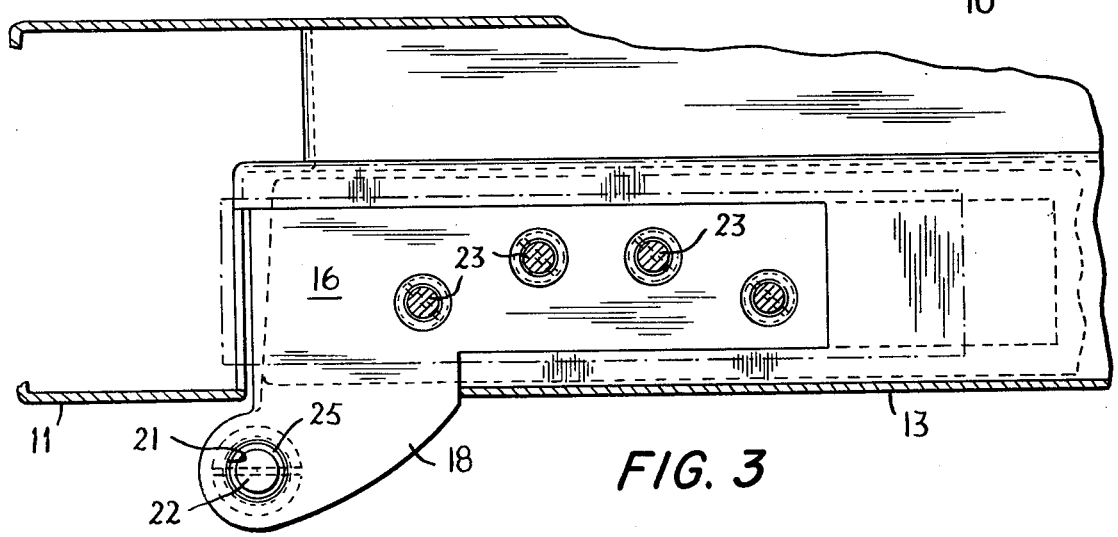
FIG. 3 is a view taken along the line 3—3 of FIG. 1.
Figure 4:
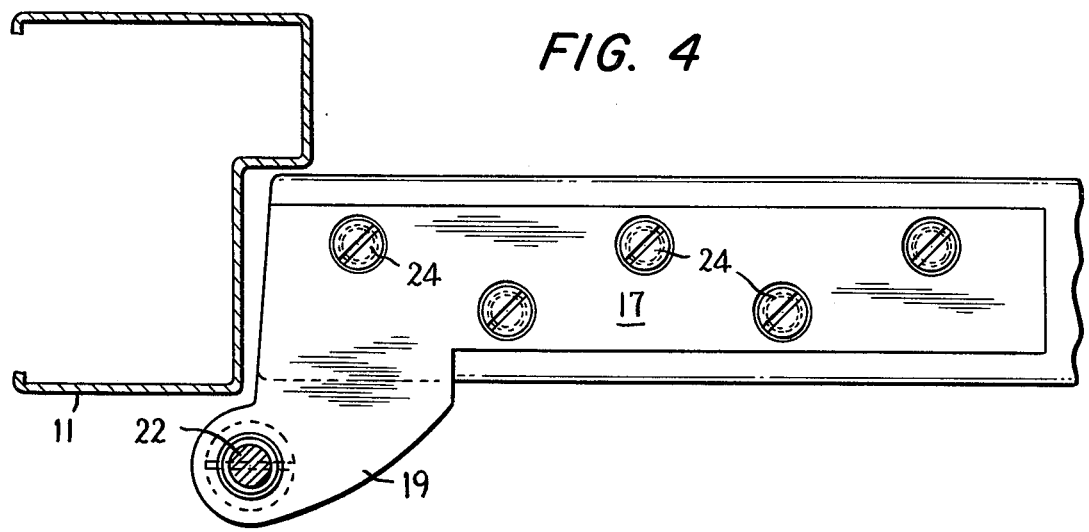
FIG. 4 is a view taken along the line 4—4 of FIG. 1.

In the present embodiment, the flange 18 is provided with an aperture 21, defining a bearing surface acting as an abutment, located adjacent its outer extremity (FIG. 3). A stud 22, which may be threadedly engaged with or otherwise attached to the lower flange 19, for example by staking, forms another bearing surface and protrudes vertically through the aperture 21 and beyond the plane of the upper flange 18. With the diameter of the stud 22 less than the diameter of the aperture 21, as shown, a substantially annular space 25 surrounds the stud within the aperture to provide a gap between the two bearing surfaces. This arrangement provides for rotational motion of the stud 22 within the aperture 21 without engagement of the two bearing members when the door 10 pivots with the stud and aperture center being substantially aligned with each other and with the pivot axis of the door.

It is a feature of the invention, however, that some misalignment may be tolerated between the stud, the aperture and the pivot axis of the door since precise alignment of these elements is mose difficult to achieve in practice. The gap 25 betwen the stud and the aperture bearing surface provides sufficient freedom for the stud to move with a slightly eccentric motion relative to the aperture without interfering with the normal functioning of the door, and without stressing the hinges 12.

Figure 5:
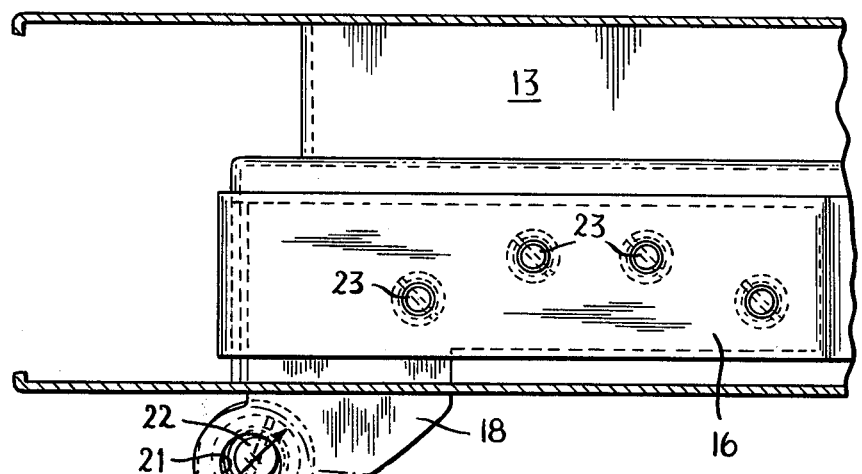
FIG. 5 is a top view of the bearing assembly of the present invention in the presence of a shearing or wracking force on the door.
Figure 5:
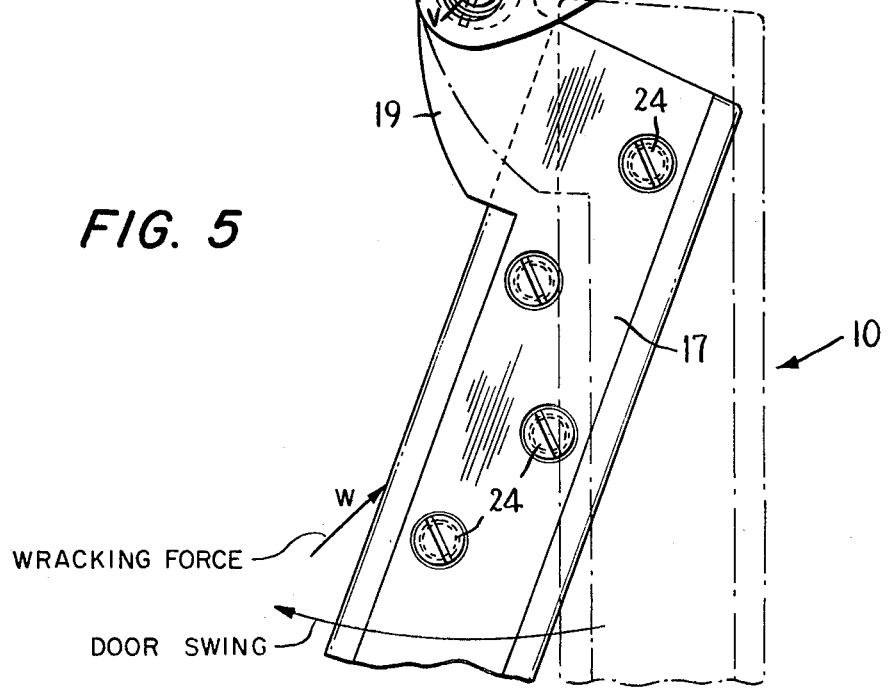
Figure 6:
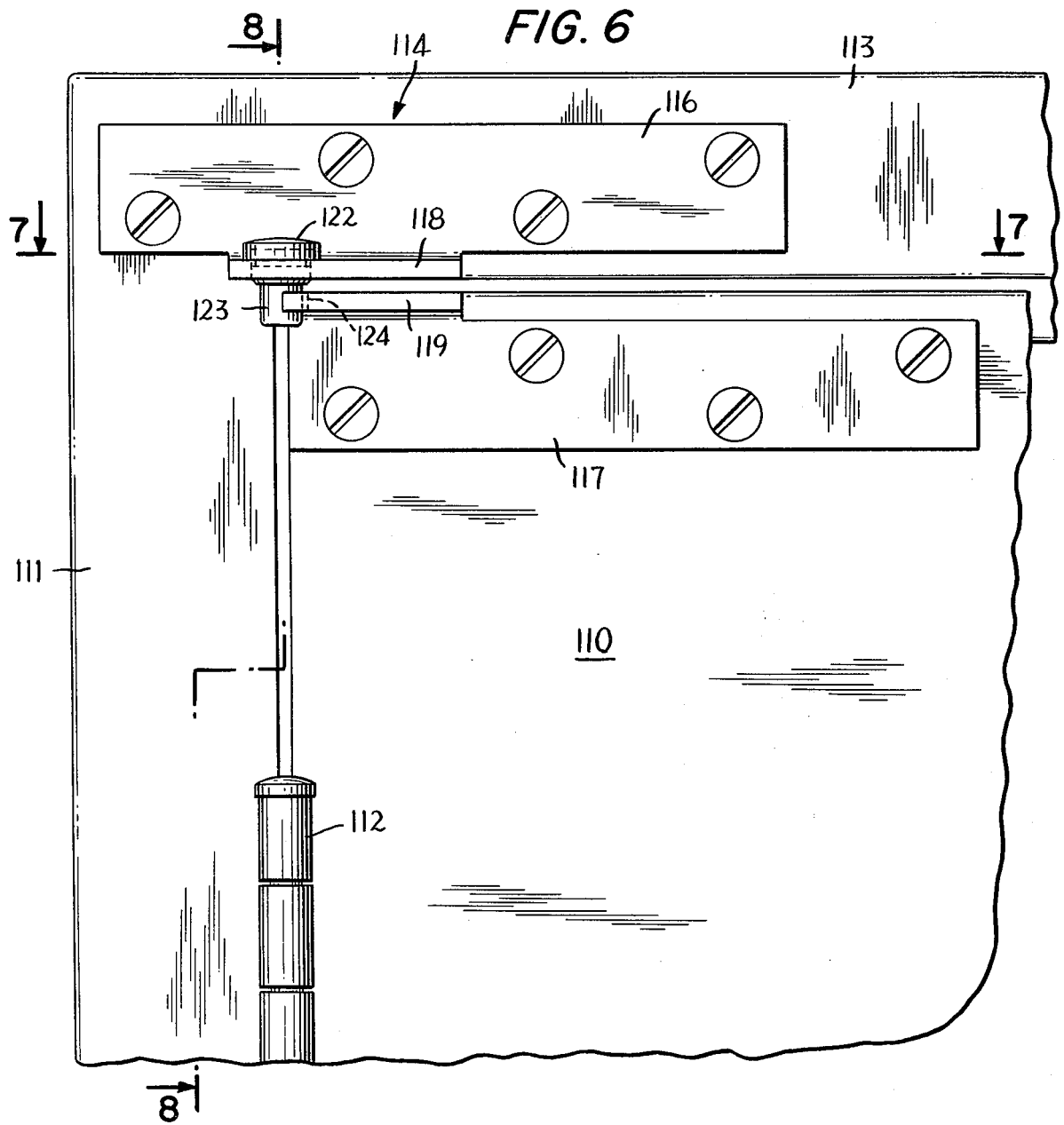
FIG. 6 is an elevation similar to FIG. 1, showing another embodiment of the present invention.

The operation of the present embodiment is illustrated in FIG. 5, in which the door 10 is depicted in phantom outline at its normal open position, for examaple approximately 90° to the plane of the opening and substantially normal to the frame 13. The door travel is interrupted when it reaches the 90° position by a door stop, for example an overhead door closer or other stop acting on a point on the door intermediate its width. The damaging wracking force develops when the momentum of the door swing is sufficient to carry the door beyond 90°, as indicated in FIG. 5. Moreover, when travelling beyond the 90° angle, the point on the door acted on by the door stop serves essentially as a fulcrum point about which the door has a tendency to pivot at the instant the door reaches its maximum opening and is decelerated by the door stop.

Thus when the door 10 is violently opened by a gust of wind or a careless individual, the wracking force produced, indicated by the arrow W in FIG. 5, will be sufficient to cause the door to move laterally approximately in the direction indicated by the arrow V to drive the stud 22 to abut the bearing surface of the aperture 21. The engagement between the cooperating bearing surfaces of the stud 22 and the flange 18 effectively prevents any further substantial movement of the door in the direction of the arrow V, thereby minimizing the effect of the wracking force W on the hinge 12.

For many applications, particularly when the bearing assembly is to be installed on the door after the door has been mounted, it is particularly convenient to secure the bearing assembly components on the sides or faces of both the door and the door frame. This arrangement is depicted in FIGS. 6–9 in which is illustrated a door 110 pivotally mounted by means of hinges 112 to a peripheral frame structure including a door jamb 111 and lintel 113.

The bearing assembly is indicated generally by reference numeral 114, and includes an upper plate 116 substantially vertically mounted on one face of the lintel 113. A lower plate 117 is substantially vertically mounted on a corresponding face of the door adjacent its top edge.

Figure 7:
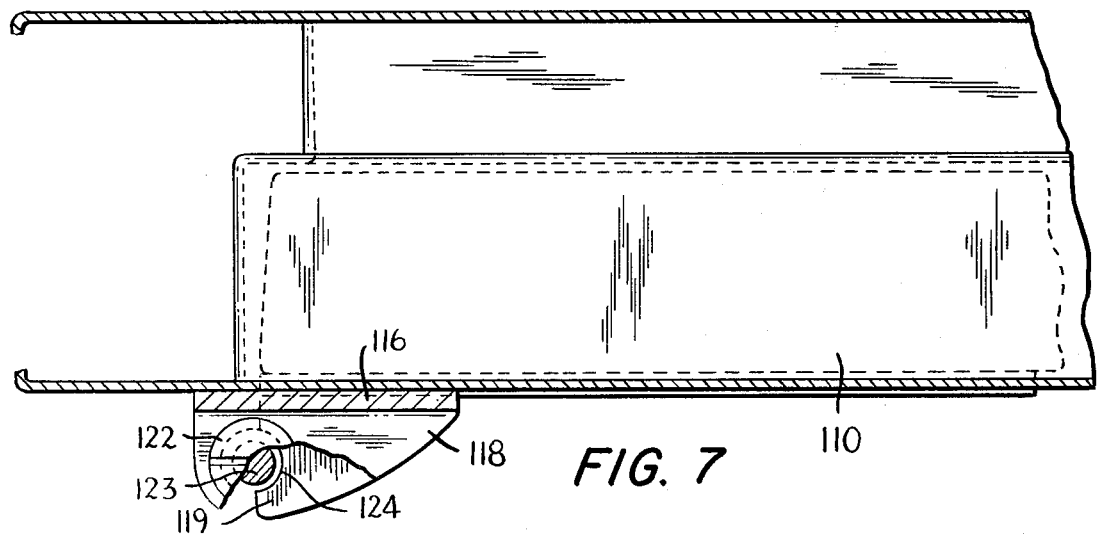
FIG. 7 is a view taken along the line 7—7 of FIG. 6.
Figure 8:
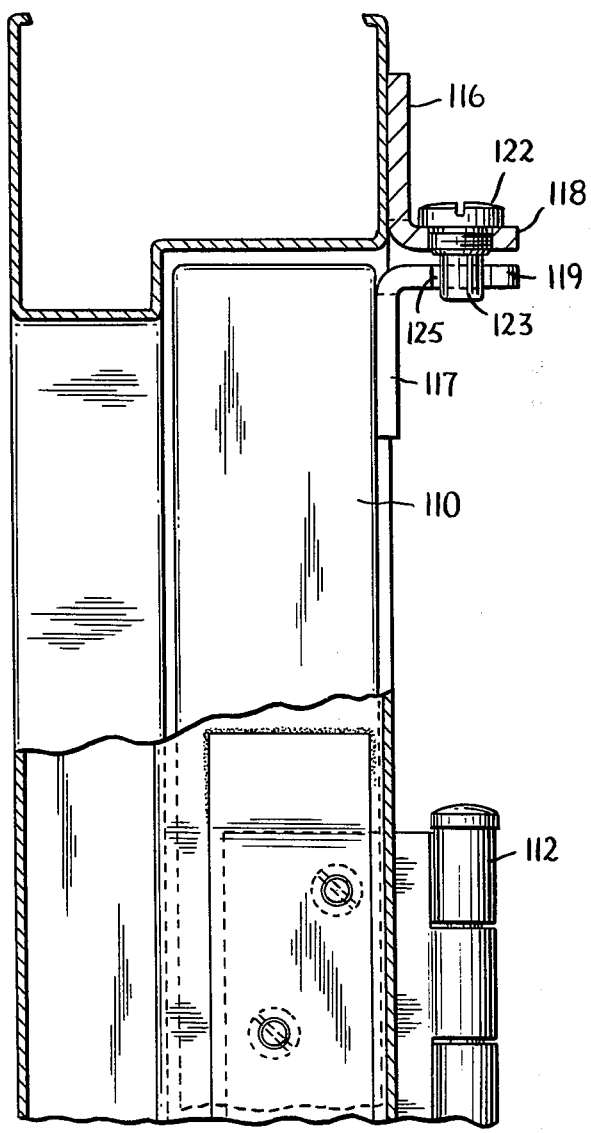
FIG. 8 is a view taken along the line 8—8 of FIG. 6.

As indicated in FIGS. 7 and 8, each of the plates 116 and 117 is provided, respectively, with similar laterally protruding flanges 118 and 119. It should be noted that the relative arrangement of the flanges 118 and 119 is preferably substantially the same as that described above with respect to the embodiment depicted in FIGS. 1–5. Indeed, it may be convenient to provide a stud an cooperating aperture substantially in the same configurations described above.

However, in the embodiment of FIGS. 6–9, a bearing surface 124, spaced from a stud 122 by a gap 125, has a substantially arcuate configuration. The stud 122 is arbitrarily mounted on or is formed as part of the upper flange 118 of the plate 116, and accordingly is fixed relative to the door 110. The arcuate bearing surface 124 preferably has a radius of curvature greater than the radius of shank 123 of the stud 122, and the arcuate length of the surface is sufficient to encompass approximately half of the stud circumference. These particular configurations and dimensions, however, are exemplary and are not intended to limit the scope of the invention.

In use, the door 110 pivots between its normal oen and closed positions without substantial engagement of the stud and arcuate bearing surface which acts as an abutment even if the bearing assembly is not precisely aligned with the door hinges 112. The arcuate surface essentially revolves back and forth around the stud as the door moves.

Figure 9:
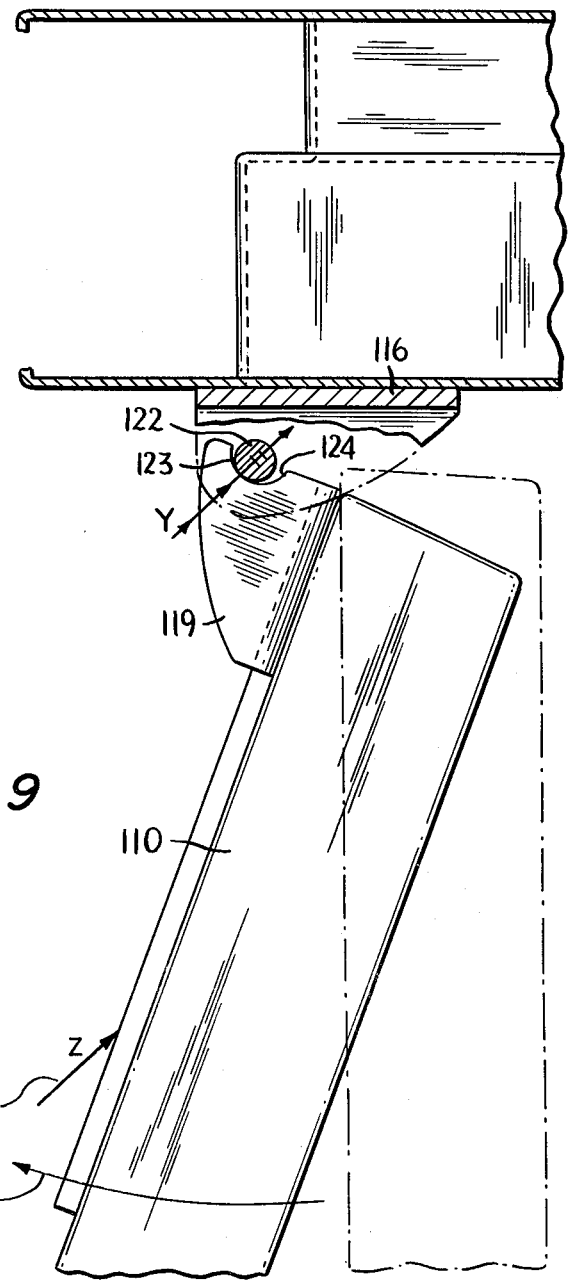
FIG. 9 is a top view of the bearing assembly of FIG. 6 at the instant of application of a shearing force to the door.

As indicated in FIG. 9, however, the door may be thrust violently open against the action of a door stop. In this event, a wracking force indicated by the arrow Z develops and urges the door to move in a lateral direction indicated by the arrow Y. such movement brings the arcuate bearing surface 124 into engagement with the stud 122. The shock absorbing bearing assembly thereby substantially absorbs the wracking force and protects the door hinges from damage.

It should be noted that while the present bearing assembly is described as mounted at a particular location on the door, other locations may be advantageously selected. For example, it may be appropriate to install one bearing assembly at the lower edge of the door, particularly when the door stop acts on the lower portion of the door. The top location is preferred when the door stop or closer is located at the top of the door since the wracking or shearing forces developed act primarily on the top door hinge.

What is claimed is:

1. A shock absorbing bearing assembly comprising a pair of bearing members, one of said members including a stud and being mountable on one of a hinged door and door frame for coaction with the other member mounted on the other of said door and door frame, the stud being in substantial alignment with the door hinge axis, and the other member including an arcuate abutment surface spaced from said stud during normal operation of the hinged door and engaged by said stud only when a wracking force is exerted on the door.

2. The shock absorbing bearing assembly of claim 1, wherein the other member includes an aperture defined by the abutment surface for coaction with the stud.

3. The shock absorbing bearing assembly of claim 1, wherein said stud is mountable on the door.

4. The shock absorbing bearing assembly of claim 1, wherein said stud is mountable on the door frame.

5. A shock absorbing bearing assembly comprising a pair of bearing members, one of said members being mountable on one of a hinged door and door frame for coaction with the other member mounted on the other of the door and door frame, thet one member including a horizontally extending flange carrying a stud in substantial alignment with the door hinge axis, the other member including a flange adjacent and substantially parallel to the one member flange and carrying an arcuate abutment surface spaced from said stud during normal operation of the hinged door and engaged by said stud only when a wracking force is exerted on the door.

6. The shock absorbing bearing assembly of claim 5, wherein the other member includes an aperture defined by the abutment surface for coaction with the stud.

7. The shock absorbing bearing assembly of claim 5, wherein said stud is mountable on the door.

8. The shock absorbing bearing assembly of claim 5, wherein said stud is mountable on the door frame.

9. In combination with a hinged door mounted on a frame for movement about an axis between a closed position and an open position at which door movement is limited by a stop acting on the door at a point intermediate its width, a shock absorbing bearing assembly commprising a first bearing member mounted on the door frame and including a first bearing surface, and a second bearing member mounted on the door and including a second bearing surface, said first bearing surface being adjacent but out of contact with said second bearing surface during normal operation of the door, the bearing surface of said second member engaging the bearing surface of said first member only when violent door movement is interrupted by the stop to absorb a wracking force exerted on the door.

10. The shock absorbing bearing assembly of claim 9 in which one of said bearing surfaces is peripherally formed on a substantially vertically protruding stud.

11. The shock absorbing bearing assembly of claim 10 in which the other of said bearing surfaces is contoured and is substantially parallel with said one bearing surface during normal operation of the door.

12. The shock absorbing bearing assembly of claim 11 in which the longitudinal axis of said stud is in substantial alignment with the door hinge axis.

13. The shock absorbing bearing assembly of claim 12 in which the contour of said other bearing surface is curved and has a center of curvature located approximately on the door hinge axis.

14. The shock absorbing bearing assembly of claim 13 in which said second member comprises a first substantially laterally extending flange member, said stud being connected adjacent the distal end of said flange.

15. The shock absorbing bearing assembly of claim 14 in which said first bearing surface is formed adjacent the distal end of a second substantially laterally extending flange member which is substantially parallel to and overlies said first flange member, said stud extending upwardly from said first flange to a point above the plane of said second flange.

16. The shock absorbing bearing assembly of claim 15 in which said second flange is provided with a substantially circular aperture defined by said first bearing surface and substantially concentric with said stud, said aperture having a diameter which is greater than the diameter of said stud.

* * * * *

PO-1050
(5/69)

UNITED STATES PATENT OFFICE
CERTIFICATE OF CORRECTION

Patent No. 3,874,027   Dated May 14, 1975

Inventor(s) John S. Parsons

It is certified that error appears in the above-identified patent and that said Letters Patent are hereby corrected as shown below:

Column 1, line 23, for "by" read --may--;

Column 3, line 31, for "mose" read --most--;

lines 40 & 41, for "examaple" read --example--;

Column 4, line 20, for "an" read --and--;

line 35, for "oen" read --open--;

line 46, for "such" read --Such--; and

Column 5, line 38, for "commprising" read --comprising--.

Signed and Sealed this sixteenth Day of September 1975

[SEAL]

Attest:

RUTH C. MASON  
Attesting Officer

C. MARSHALL DANN  
Commissioner of Patents and Trademarks